United States Patent
Hall

(10) Patent No.: US 11,310,231 B2
(45) Date of Patent: *Apr. 19, 2022

(54) SYSTEMS AND METHODS FOR SECURE ONLINE CREDENTIAL AUTHENTICATION

(71) Applicant: ID.me, Inc., McLean, VA (US)

(72) Inventor: Blake Hall, Washington, DC (US)

(73) Assignee: ID.me, Inc., McLean, VA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/557,161

(22) Filed: Aug. 30, 2019

(65) Prior Publication Data

US 2020/0076802 A1    Mar. 5, 2020

Related U.S. Application Data

(63) Continuation of application No. 15/294,434, filed on Oct. 14, 2016, now Pat. No. 10,469,492.

(60) Provisional application No. 62/241,880, filed on Oct. 15, 2015.

(51) Int. Cl.
*H04L 29/06* (2006.01)
*G06F 21/33* (2013.01)

(52) U.S. Cl.
CPC ......... *H04L 63/0876* (2013.01); *G06F 21/33* (2013.01); *H04L 63/126* (2013.01); *H04L 63/06* (2013.01)

(58) Field of Classification Search
CPC . H04L 9/0618; H04L 9/002; H04L 2209/043; G06C 21/12; G06C 1/00
USPC ................................. 380/42; 726/6
See application file for complete search history.

(56) References Cited

U.S. PATENT DOCUMENTS

| | | |
|---|---|---|
| 7,836,310 B1 | 11/2010 | Gutnik |
| 8,843,997 B1 | 9/2014 | Hare |
| 2002/0035555 A1 | 3/2002 | Wheeler et al. |
| 2007/0245148 A1 | 10/2007 | Buer |
| 2008/0046984 A1 | 2/2008 | Bohmer et al. |
| 2010/0250676 A1 | 9/2010 | Ufford et al. |
| 2010/0250955 A1 | 9/2010 | Trevithick et al. |
| 2013/0103951 A1* | 4/2013 | Kievan ............... H04L 9/3242 713/186 |
| 2013/0247159 A1 | 9/2013 | Hall et al. |

(Continued)

OTHER PUBLICATIONS

International Preliminary Report on Patentability issued in corresponding International Application No. PCT/US2016/057201, dated Oct. 14, 2016 (20 pages).

*Primary Examiner* — Evans Desrosiers
(74) *Attorney, Agent, or Firm* — Bookoff McAndrews, PLLC

(57) ABSTRACT

Systems, methods, and non-transitory computer-readable medium are disclosed includes for secure online credential authentication. One method includes receiving, over an electronic network, identification information from an identity provider; accessing, from a database, previously stored hashed identification information stored in association with a previous identity provider; comparing the identification information to previously stored hashed identification information; and storing the identification information in association with the identity provider that provided the identification information in the database when the hashed identification information does not match previously stored hashed identification information.

20 Claims, 5 Drawing Sheets

(56) References Cited

U.S. PATENT DOCUMENTS

2014/0012616 A1   1/2014  Moshenek
2014/0101734 A1   4/2014  Ronda et al.
2015/0058931 A1*  2/2015  Miu ........................ G06Q 20/02
                                                              726/3

* cited by examiner

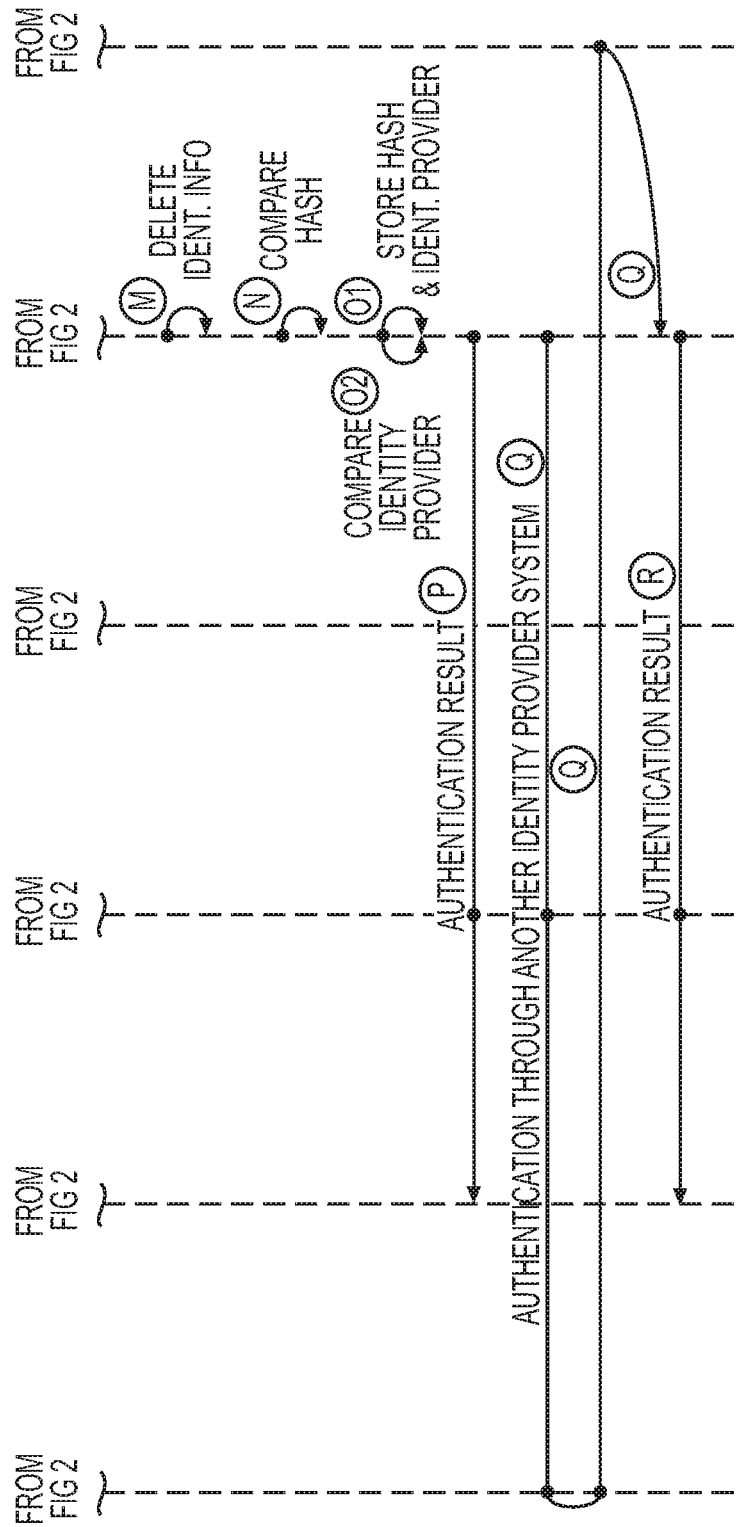

SYSTEMS AND METHODS FOR SECURE ONLINE CREDENTIAL AUTHENTICATION

CROSS REFERENCE TO RELATED APPLICATIONS

This application claims the benefit of priority to U.S. Provisional Application No. 62/241,880, filed Oct. 15, 2015, the entire contents of which is herein incorporated by reference.

TECHNICAL FIELD

Various embodiments of the present disclosure relate generally to secure online credential authentication.

BACKGROUND

Authentication of a user's identity and/or credentials in a networked environment requires the ability to associate a user and/or credential with an online identity, such as a username and/or email address. Assurance levels ("ALs") relate to a degree of confidence that a claimed identity is related to an online identity. Additionally, ALs relate the degree of confidence that a claimed credential is associated with the online identity. Assurance levels have been defined in a number of documents by standards bodies, including the U.S. Office of Management and Budget ("OMB"), International Organization for Standardization ("ISO"), National Institute of Standards and Technology ("NIST"), Federal Identity, Credential, and Access Management ("FICAM"), the Kantara Initiative, etc., such as OMB M-04-04, NIST 800-63-2, etc.

Parties seeking authentication of an online identity and/or a credential of an online identity may require a certain AL before conducting an online or offline transaction with the user being authenticated. The level of assurance (AL) or trust the party requires may be necessary to mitigate risk in their transactions, especially in matters of finance and national security.

The present disclosure relates to systems and methods for providing a remotely verified authentication of online identities and credentials to relying parties, which can be trusted by the relying parties consistent with the determined or requested assurance level.

SUMMARY OF THE DISCLOSURE

Embodiments of the present disclosure include systems, methods, and non-transitory computer-readable media for online authentication of online attributes.

According to embodiments of the present disclosure, a computer-implemented method for secure online credential authentication is disclosed. One method includes receiving, at a server over an electronic network, identification information from an identity provider; accessing, by the server from a database, previously stored hashed identification information stored in association with a previous identity provider; comparing, by the server, the identification information to previously stored hashed identification information; and storing, by the server, the identification information in association with the identity provider that provided the identification information in the database when the hashed identification information does not match previously stored hashed identification information.

According to embodiments of the present disclosure, a system for secure online credential authentication is disclosed. One system includes a data storage device that stores instructions system for secure online credential authentication; and a processor configured to execute the instructions to perform a method including: receiving, over an electronic network, identification information from an identity provider; accessing, from a database, previously stored hashed identification information stored in association with a previous identity provider; comparing the identification information to previously stored hashed identification information; and storing the identification information in association with the identity provider that provided the identification information in the database when the hashed identification information does not match previously stored hashed identification information.

According to embodiments of the present disclosure, a non-transitory computer-readable medium storing instructions that, when executed by a computer, cause the computer to perform a method for secure online credential authentication is disclosed. The method of the non-transitory computer-readable medium including: receiving, over an electronic network, identification information from an identity provider; accessing, from a database, previously stored hashed identification information stored in association with a previous identity provider; comparing the identification information to previously stored hashed identification information; and storing the identification information in association with the identity provider that provided the identification information in the database when the hashed identification information does not match previously stored hashed identification information.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DESCRIPTION OF THE EMBODIMENTS

Figure 1:
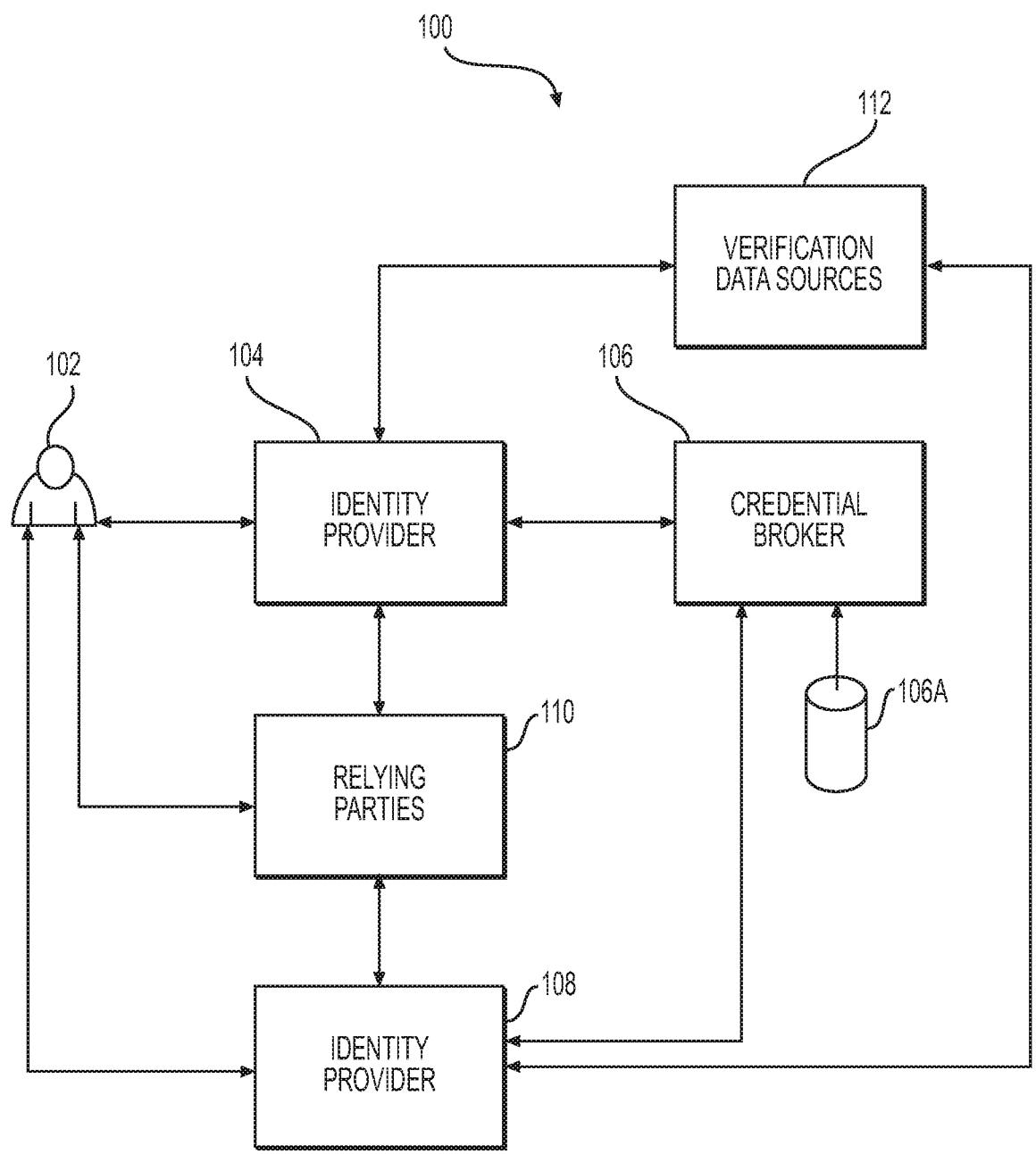
FIG. 1 depicts a networked environment for online authentication of a user utilizing a credential broker, according to an embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

An identity provider, also referred to as a credential service provider, may provide authentication services in order to verify an online identity and/or one or more credentials of a user (real person) in a networked environment. The identity provider, in verifying an online identity and/or a credential of a user, may associate the user with an online identity, such as a username, and the one or more credentials with the online identity. When verifying (authenticating) online identities and/or credentials, an assurance level ("AL"), which relates to a degree of confidence that an online identity and/or a credential are associated with the user are accurate, may be determined through various procedures. Online identities, credentials, and associated ALs may all be stored by an identity provider to serve future authentication requests and/or to preserve histories of changes related to a user. Examples of identity providers that rely on low assurance levels may include ID.me, Facebook Connect, Google, and LinkedIn. Examples of identity providers that rely on high assurance levels may include ID.me, Symantec, Verizon, and bank logins.

A relying party ("RP") may be one or more of an organization, a business, and/or an individual that seek authentication of a user. RPs may provide user related data to the identity provider to request authentication of a new and/or unidentified online identity, to request authentication of the credentials of a user, and/or to seek re-authentication of an online identity and/or credential of a user. Additionally, and/or alternatively, a user (real person) may provide user-related data to the identity provider to authenticate themselves with an online identity and/or to authenticate a credential.

A credential broker may allow a plurality of identity providers (credential service providers) to integrate their authentication services with multiple relying parties. A credential broker may also allow a plurality of relying parties that wish to authenticate an online identity and/or one or more credentials of a user (real person) in a networked environment to integrate a single entity, the credential broker, rather than a plurality of identity providers (credential service providers). In one embodiment of the present disclosure, a credential broker and an identity provider may be a single entity.

In order to authenticate a user's online identity and/or credential, the identity provider may access various verification data sources. These verification data sources may provide various trustworthy data related to the user for the authentication party. For example, verification data sources may include, but are not limited to, federal agencies, financial institutions, membership organizations, credit bureaus, national archives, etc.

The identity provider may maintain an internal directory of users in an identity core database. The identity core database may be unpublished and/or inaccessible to third-parties. The identity core database may be used by the identity party to provide authentication services and/or provide ALs via various online data formats and protocols, such as a Security Assertion Markup Language ("SAML"), OAuth, OpenID, etc. The process of populating the identity core database may occur in response to a RP seeking authentication of an online identity and/or credential. The identity provider may create and/or implement a pre-defined procedure for a particular RP in order to automatically obtain the requested authentications and/or ALs. The procedures defined for an RP may instruct the identity provider which verification data sources to access in order to provide an authentication and/or a requested AL.

A credential broker, for a transaction to be authenticated, may receive identification information from an identity provider. Alternatively, the credential broker, for the transaction to be authenticated, may receive identification information directly from a user and/or a third-party. The identification information may include one or more of a first name, last name, full name, date of birth, social security number, address, and/or other information related to the user. In one embodiment, if the identity provider and the credential broker are the same entity, the credential broker may receive login information and lookup identification information stored in, for example, the identity core database. In another embodiment, if the identity provider and the credential broker are different entities, the credential broker may receive the identification information from a requester.

Upon receiving and/or retrieving, the identification information, the credential broker may then hash the identification information. After the credential broker hashes the identification information, the credential broker may remove and/or delete the identification information. In alternative embodiment, the credential broker, for a transaction to be authenticated, may receive a predetermined hash of the identification information. The predetermined hash may be hashed identification information provided by a requestor. The predetermined hash may be a hash of identification information that the credential provider and the requestor have previously determined to be used for the predetermined hash.

The credential broker may then compare the hashed identification information with previously stored hashed identification information in a hash database of the credential broker. If the hashed identification information does not match any previously stored hashed identification information, the credential broker may store the hashed identification information and the identity provider transmitting the identification information in the hash database. The credential broker may then transmit an authentication result to a relying party.

If the hashed identification information matches a previously stored hashed identification information, the credential broker may compare the identity provider that sent the identification information to a previous identity provider stored in association with the previously stored hashed identification information. If the current identity provider matches the previous identity provider, then the credential broker may then transmit an authentication result to the RP.

If the hashed identification information matches a previously stored hashed identification information and the current identity provider does not match the previous identity provider, then the user may authenticate their identity with the previous identity provider. Alternatively, if the hashed identification information matches a previously stored hashed identification information and the current identity provider does not match the previous identity provider, then the user may be notified to authenticate their identity with the previous identity provider.

In one embodiment of the present disclosure, authentication requests from one or more of the identity provider, credential broker, a RP, and/or a user may be encrypted and/or signed. Additionally, and/or alternatively, any communications between the identity provider, RP, credential broker, verification data sources, and/or users may be encrypted and/or signed using various cryptology methods, including SSL and/or SOAP.

Users that are being authenticated by a relying party may authorize the identity provider to access the verification data sources prior to authentication and/or prior to the authentication being presented to the RP.

The systems and methods described herein may provide a secure way of authenticating a user while also providing privacy for the user. A benefit of the present disclosure is that a credential broker does not maintain any personal identification information of the user while being able to authenticate the user based on non-personally identifiable hashed information. Further, if a user's personal identification information is stolen and if their secure login information is compromised, the user's online credentials may remain secure through the user of the credential broker.

For example, if the user's person identification information is stolen, an identity thief may use the user's stolen name, date of birth, address, and/or social security number to attempt to open a new account. When the identify thief attempts to login with a new identity provider that utilizes a credential broker as described herein, the identity thief may be requested to provide login information of a separate, previously stored identity provider if the user has previously used the credential broker. In this example, an identity thief may be in possession of static personally information of the user, but the identity thief may not know how to authenticate that identity via a previously registered user. If the legitimate user has not previously used the credential broker, the user may be notified of the identity theft (when attempting to register with the credential broker) because the legitimate user will not be able to log into an account that uses the credential broker. The legitimate user may then be able to assert control over their online identity through their legitimate credentials and prevent further fraud. In another example, one or more of an organization, business, and/or relying party may suffer from fraud, hacking, or theft, and may notify the credential broker and/or users. Then, the credential broker may revoke credentials that have been compromised, and may notify users of compromised credentials to restore control and registration of new credentials.

As discussed above and below, a benefit of the present disclosure is that it may allow for identity proofing. In particular, the present disclosure may allow for an individual to be validated and/or one or more attributes of an individual, such as first name, last name, social security number, date of birth, and/or address, to be validated. Accordingly, the present disclosure may allow for the individual to be validated upon validation of the one or more attributes. For example, an individual may be validated upon confirming that the individual's name is John Smith with a date of birth of Jun. 10, 1985, and a home and/or mailing address of 123 King Street, Alexandria, Va. 22222. Further, the present disclosure may include the ability to use the one or more attributes to resolve to an individual to a single, unique identity. For example, a social security number ("SSN") may be used by a bank to resolve multiple John Smiths with the same date of birth to a particular individual. Upon resolving the individual to the single, unique identity, a digital credential may be issued to the individual. The digital credential, along with the one or more attributes and/or other information, may then be used to determine whether an individual having the digital credential is the legitimate individual or an identity thief.

One exemplary use of the present disclosure may be in voting. A non-personally identifiable, unique identifier may be assigned to a voter. The non-personally identifiable, unique identifier may be hashed and published to a block chain and/or a database after the particular identity (person) votes in the election. When combined with identity proofing at a high assurance level that meets federal standards and an ability to establish voting age, citizenship, and uniqueness, then the combination of the present disclosure with public records may record that a specific, unique legal identity of a voting age cast his/her vote for a particular candidate without revealing the actual identity of the voter.

Another exemplary use of the present disclosure may be with Federal Bureau of Investigation ("FBI") background check results. Currently, the FBI allows citizens to request their own criminal background histories. The FBI also may send background check results to state and local government agencies to determine whether a particular person may work in a regulated industry, such as at an airport, as an in-home caregiver, a taxi driver, an ambulance driver, etc. However, a citizen, who has requested their own criminal background history may not be able to share their results with a third party directly without ensuring the results have not been manipulated. The problem with the citizen path is that a chain of custody goes the FBI to the citizen to a third party. By use of the present disclosure, the FBI may publish the citizen's criminal background check results to a private block chain, and the citizen may control delegated access to the results. The block chain may prevent the results from alteration and the hashing of the identification information by a credential broker may ensure that the legitimate citizen maintained complete control over the release of their criminal background check results.

Yet another exemplary use of the present disclosure may be with banking and/or sharing economy applications. Banks may need to comply with Know Your Customer ("KYC"), Anti-Money Laundering ("AML"), and/or Office of Foreign Assets Control ("OFAC") regulations. Sharing economy apps, such as Uber and AirBnB, may also need to verify the identity and criminal history of their suppliers (though requirements differ from city to city and state to state for sharing economy). The present disclosure as described above and below, may lower the risk of fraud to these industries, particularly as the number of identities registered via the credential broker increases.

FIG. 1 depicts a networked environment 100 for online authentication of a user 102 utilizing a credential broker, according to an embodiment of the present disclosure. The networked environment 100 includes relying party systems 110 that may request authentication of an online identity and/or credentials of a user 102, identity provider systems 104 and 108 that may authenticate the online identity and/or credential, a credential broker 106 that may provide secure online credential authentication for an identity provider, verification data source systems 112, which may verify identification information of the user 102 for the identity providers 104, 108 and which may provide data to authenticate an online identity and/or credential.

A user to be authenticated may be directed to the identity provider system 104 of the identity provider by a relying party system 110 of a relying party. The assurance level ("AL") required by the relying party for an online transaction conducted for relying party system 110 may be provided in an authentication request from the relying party. Alternatively, and/or additionally, the AL may be determined by the identity provider system 104 by reviewing the authentication request from relying party system 110 and/or determined by the credential broker 106. For example, the identity provider system 104 may determine an AL needed by examining an authentication request for a user from relying party system 110, and cross-referencing the authentication request with one or more predetermined policies associated with the relying party. Alternatively, and/or additionally, the identity provider system 104 and/or credential broker 106 may examine an authentication request for a user 102 from relying party system 110, and may cross-reference the authentication request with one or more previous authentication requests from the relying party and/or identity provider to determine an AL needed.

In an exemplary embodiment, the user 102 may visit a government agency website (i.e., a relying party system 110 website). The government agency website (relying party system 110 website) may request the user 102 login (authentication request) using login information of a bank (i.e., an identity provider 104).

A user 102 may login with the bank (identity provider system 104) via the government agency website (relying party system 110 website). The bank system (identity provider system 104) may determine which identification information of the user 102 may be needed for authentication to a predetermined AL. In an alternative embodiment, upon logging in, the user 102 may be directed to the credential broker system 106. The credential broker system 106 may determine that the user 102 should be routed to the bank system (identity provider system 104) for authentication to a predetermined AL.

The bank system (identity provider system 104) may transmit identification information to the credential broker 106 for secure online authentication of the credential that may meet the predetermined assurance level. In an alternative embodiment, the bank system (identity provider system 104), prior to transmitting identification information, may request permission from user 102 to transmit identification information to the credential broker system 106 via the government agency website (relying party system 110).

The credential broker 106 may receive identification information from the bank system (identity provider system 104). In one embodiment, if the identification information is encrypted, the credential broker 106 may decrypt the identification information. Upon receiving and/or decrypting the identification information, the credential broker 106 may hash the identification information using a hash function. Upon hashing the identification information, the credential broker 106 may delete and/or remove the received identification information of the user 102. The hash of the identification information may then be stored in association with the identity provider system that transmitted the identification information. The identification information may be hashed to prevent the storage of personal information in a database, and to ensure that the identification information is stored in a way that is meaningless to an identity thief.

In an alternative embodiment, the bank system (identity provider system 104) may hash the identification information, and may transmit the hashed identification information. Additionally, the bank system (identity provider system 104) may encrypt the hashed identification information prior to transmitting the hashed identification information to the credential broker 106.

In one embodiment, all of the identification information may be used to produce a hash. In an alternative embodiment, a portion of the identification information may be used to produce a hash. In yet another embodiment, multiple hashes may be produced, each hash using different portions of the identification information to produce the hash. For example, an individual may change his or her first and/or last name. Thus, multiple hashes may be produced, a first has may be hashes of the individual's first name, social security number, address, a second hash may be hashes of the individual's last name, phone number, and date of birth, a third hash may be hashes of the individual's social security number, date of birth, and address, etc. Accordingly, if one match, as discussed below, fails (such as the case where the last name has changed), then another hash may be used to resolve the individual to a unique identity.

Upon receiving the hashed identification information, the credential broker 106 may compare the hashed identification information with previously stored hashed identification information in a hash database 106A of the credential broker 106. If the hashed identification information does not match any previously stored hashed identification information, the credential broker 106 may store the hashed identification information and the identity provider transmitting the identification information in the hash database 106A. The credential broker may then transmit an authentication result to the government agency website (relying party system 110 website) via the banking system (identity provider system 104). In one embodiment, the authentication result may indicate that the user 102 is a new user. The authentication result may be encrypted by the credential broker 106 prior to transmission.

If the hashed identification information matches a previously stored hashed identification information, the credential broker 106 may compare the banking system (identity provider system 104) that sent the identification information to a previous identity provider system stored in association with the previously stored hashed identification information. If the current identity provider 104 (banking system) matches the previous identity provider, then the credential broker 106 may transmit an authentication result to a relying party. In one embodiment, the authentication result may indicate that the user 102 is an existing user. The authentication result may be encrypted by the credential broker 106 prior to transmission.

If the hashed identification information matches a previously stored hashed identification information and the current banking system (identity provider system 104) does not match the previous identity provider (identity provider system 108), then the user 102 may authenticate their identity with the previous identity provider 108. Alternatively, if the hashed identification information matches a previously stored hashed identification information and the current identity provider does not match the previous identity provider, then the user 102 may be notified to authenticate their identity with the previous identity provider 108.

Figure 2:
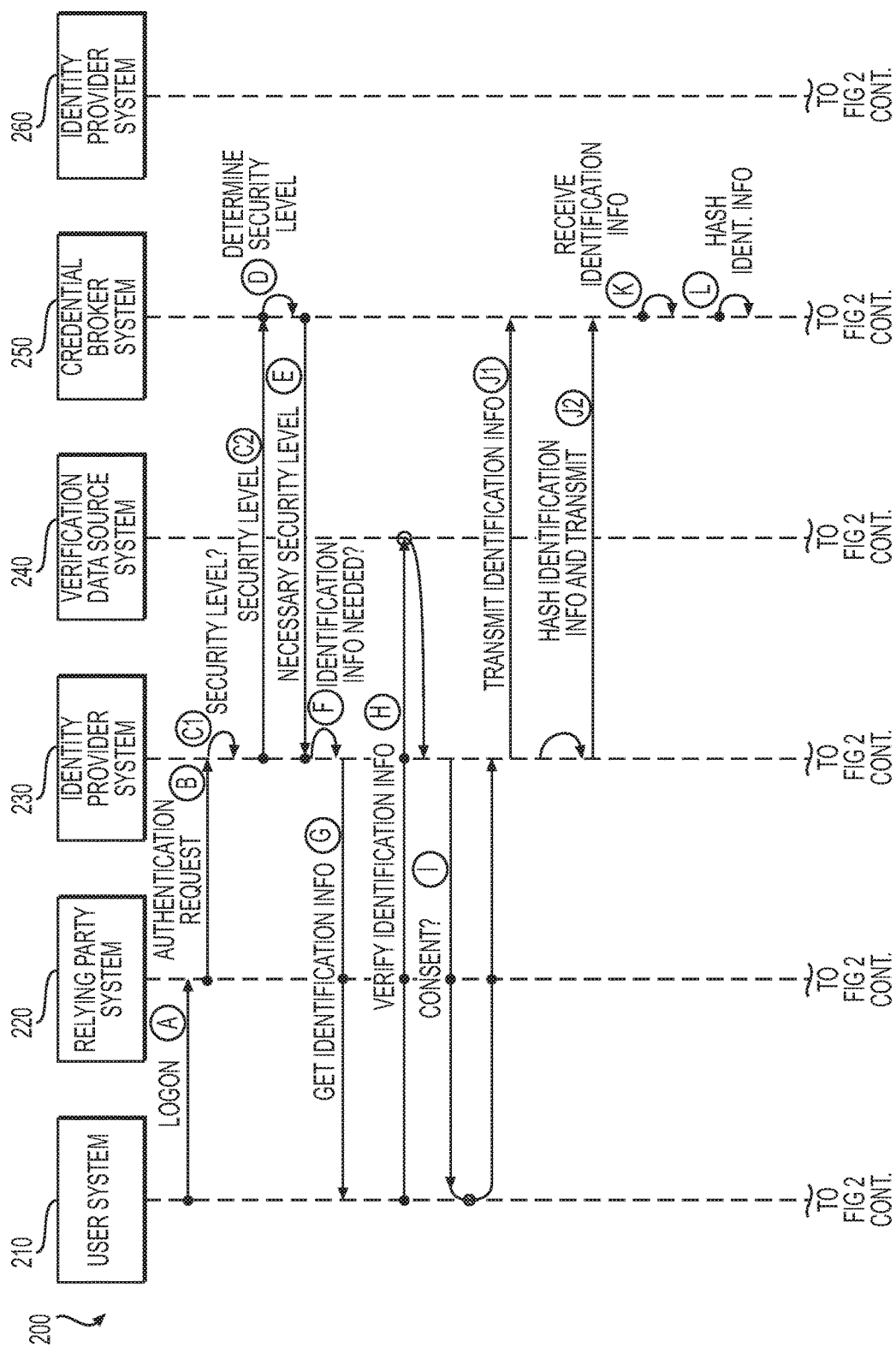
FIG. 2 depicts a flow diagram providing a method in which online identities and/or credentials may be authenticated through a credential broker, according to one embodiment of the present disclosure.

FIG. 2 depicts a flow diagram 200 providing a method in which online identities and/or credentials may be authenticated through a credential broker 106, according to one embodiment of the present disclosure. As shown in flow diagram 200, systems of various parties may be accessed and/or communicate in the process of authenticating an online identity and/or credential of a user through a credential broker. Flow diagram 200 of FIG. 2 includes a user system 210, a relying party ("RP") system 220, an identity provider system 230, a verification data source system 240, a credential broker system 250, and another identity provider system 260.

Authentication may begin by user system 210 visiting a website and/or application of relying party system 220, as shown by step A. Alternatively, authentication may begin by user system 210 logging into a website and/or application of the identity provider system 230. The relying party system 220 at step B may then provide an authentication request to the identity provider system 230. For example, the authentication request may request authentication of an online identity and/or credential of a user.

Identity provider system 230 may then determine what assurance level is needed by the authentication request at step C1. Alternatively, identity provider system 230 may direct the authentication request to credential broker system 250 at step C2. Then, credential broker system 250 at step D may determine what AL is needed by the authentication request. The credential broker system 250 may then transmit the AL needed for the authentication request to identity provider system 230 at step E.

Identity provider system 230 may determine identification information needed for the AL required at F. If the identity provider system 230 does not have the identification information needed for the AL required, then the identity provider system 230 may collect identification information from the user via the relying party system 220 at step G. Identity provider system 230 may verify the collected identification information by transmitting it to verification data source system 240 for verification and receiving a result at step H.

The identification information may then be transmitted to the user system 102 via the relying party system 220 to obtain consent from the user to transmit to credential broker 250 at step I. Upon receiving consent, the identity provider system 230 may transmit the identification information to credential broker system 250 at step J1. Alternatively, the identity provider system 230 may hash the identification information using a hashing function, and transmit the hashed identification information to credential broker system 250 at step J2. The identification information and the hashed identification information may optionally be encrypted prior to transmitting the identification information and hashed identification information to the credential broker system 250.

The credential broker system 250 may receive the identification information at step K. If the identification information is encrypted, the credential broker system 250 may decrypt the identification information. If the identification information is hashed, the method proceeds to step N.

If the identification information is not hashed, the credential broker system 250 may hash the identification information using a hashing function at step L. Then the credential broker system 250 may delete (remove) the identification information at step M. At step N, the credential broker system 250 may compare the hashed identification information with previously stored hashed identification information in a hash database 106A of the credential broker system 250. If the hashed identification information does not match any previously stored hashed identification information, then the credential broker system 250 may store the hashed identification information and the identity provider system 230 transmitting the identification information in the hash database at step O1. The credential broker system 250 may transmit an authentication result to the relying party system 220 via the identity provider system 230 at step P. The authentication result may be encrypted by the credential broker system 250 prior to transmission.

If the hashed identification information matches a previously stored hashed identification information, the credential broker system at step O2 may compare the identity provider system 230 that sent the identification information to a previous identity provider system stored in association with the previously stored hashed identification information. If the current identity provider system 230 matches the previous identity provider, then the credential broker system 250 may transmit an authentication result to the relying party system 220 via the identity provider system 230 at step P. The authentication result may be encrypted by the credential broker system 250 prior to transmission.

If the hashed identification information matches a previously stored hashed identification information and the identity provider system 230 does not match the previous identity provider system, such as identity provider system 260, then the user system 210 may authenticate a credential of the user with the identity provider system 260 via the credential broker system 250 at step Q. If the user system 210 authenticates their identity with credential broker system 250 via identity provider system 260, then an authentication result may be transmitted by credential broker system 250 to the relying party system 220 via the identity provider system 230 at step R.

Figure 3:
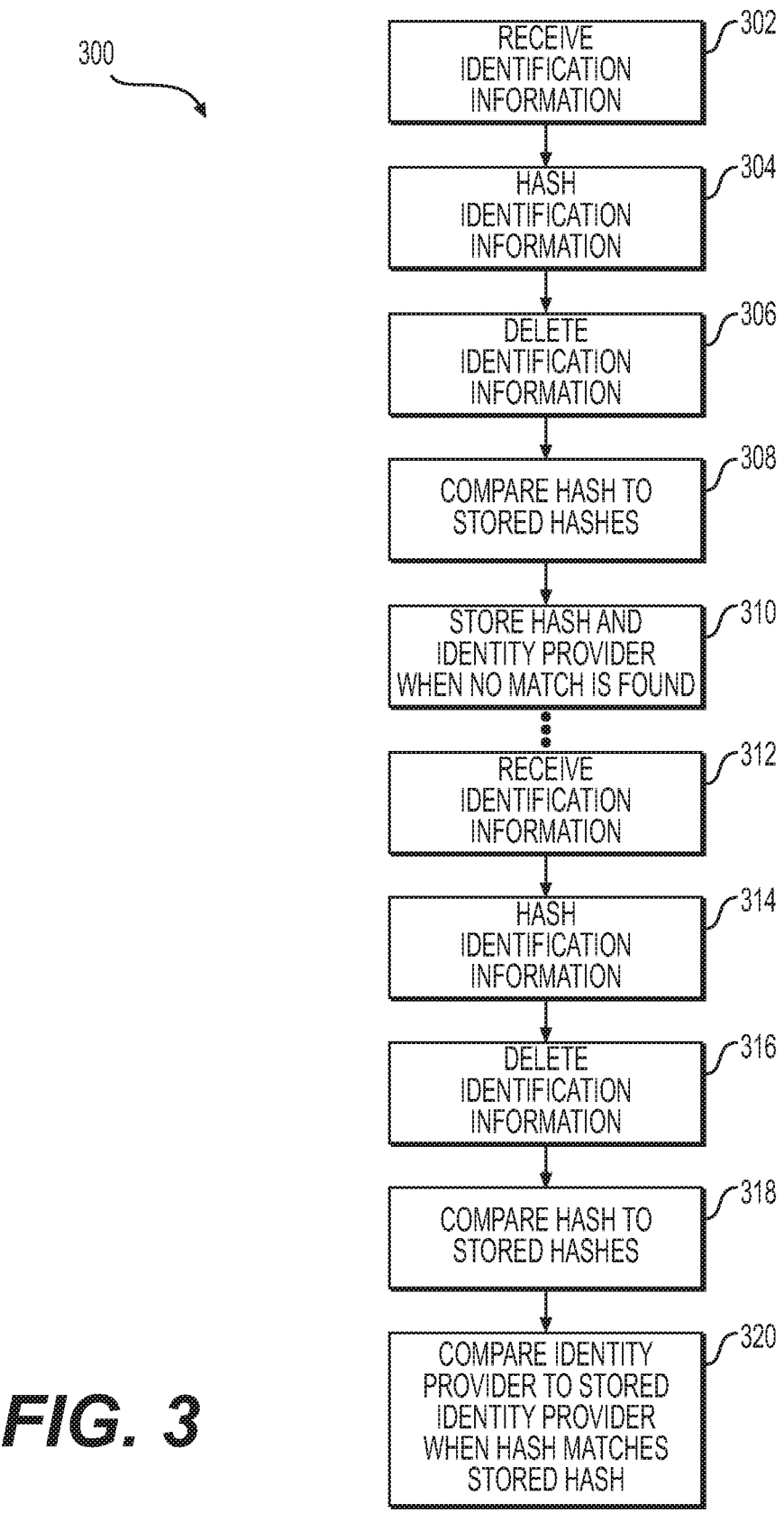
FIG. 3 depicts a flow diagram 300 providing a method for secure online credential authentication, according to one embodiment of the present disclosure.

FIG. 3 depicts a flow diagram 300 providing a method for secure online credential authentication, according to one embodiment of the present disclosure. The method may begin at step 302 in which a credential provider may receive, over an electronic network, identification information from an identity provider. At step 304, the credential provider may hash the received identification information from the identity provider by utilizing a hashing function to produce hashed identification information. After the identification information has been hashed, the credential broker may delete (remove) the received identification information from the identity provider at step 306. In one embodiment, a portion of identification information may be deleted (removed).

The credential broker may access a database in which previously hashed identification information is stored in association with a previous identity provider. Then, at step 308, the credential broker may compare the hashed identification information to previously stored hashed identification information. When the hashed identification information does not match previously stored hashed identification information, the credential broker may store the hashed identification information in association with the identity provider that provided the identification information in the database at step 310.

At some time after storing the hashed identification information in association with the identity provider, the credential broker may receive, over an electronic network, identification information from an identity provider at step 312. The credential broker may hash the received identification information from the identity provider by utilizing a hashing function to produce hashed identification information at step 314. After the identification information has been hashed, the credential broker may delete (remove) the received identification information from the identity provider at step 316.

The credential broker may access a database in which previously hashed identification information is stored in association with a previous identity provider. Then, at step 318, the credential broker may compare the hashed identification information to previously stored hashed identification information. When the hashed identification information matches previously stored hashed identification information, the credential broker may compare the identity provider that provided the identification information to previously stored identity providers stored in association with the previously stored hashed identification information at step 320.

A log of all relevant transactions may be maintained though one or both of an automated logging system and/or a manual logging system for a predetermined time period. Transaction logs may be retained and protected against unauthorized access, loss, and/or corruption. Additionally, transaction logs may be used to support audit functions and any investigative processes. In one embodiment, a credential broker may not maintain transaction logs. In another embodiment, a credential broker may only maintain hashed identification information associated with the identity provider that provided the identification information.

Event logs may include one or more of an event serial number and/or sequence number that provides a unique reference for the event; a date and time of the event; a description of the event; any users, persons, devices, applications, networks and/or operating systems associated with the event; and/or other pertinent information, as discussed below.

Systems of the identity provider and/or credential broker may be housed in secure data centers. The secure data centers may be located at geographical alternate sites, and may include multi-layer physical security. Use of such data centers allows for the minimization of opportunities for unauthorized access, disclosure, loss, and/or corruption of sensitive and system information, and of IT resources upon which the service is dependent. The location and construction, when combined with other physical security protection mechanisms, such as guards and intrusion sensors, may provide robust protection against unauthorized access to the identity provider's and/or credential broker's equipment and records and protection from adverse environmental conditions.

If the identity provider and/or credential broker uses third-party hosting, the ability of the identity provider and/or credential broker to provide facilities that meet the above-described security considerations may be determined either by a physical inspection by the authentication party and/or through review of independent analyses and audits of the facilities.

The identity provider and/or credential broker may also use development facilities, which do not process real user data, may also be protected by multi-layer physical security, minimizing the opportunities for unauthorized access, disclosure, loss, and/or corruption of sensitive and system information, and of IT resources on which development is dependent. The identity provider and/or credential broker may also use back-up and/or disaster-recovery sites including the same level of protection. A reduced level of security may be permissible to the extent that no real user data is stored. Security may be sufficient to ensure that the sensitivity of proprietary information and the ability to support the production system is not compromised.

The identity provider and/or credential broker may also allow information and media to be transported between sites. Sensitive information and IT resources in the custody of staff of an identity provider and/or credential broker may be protected from unauthorized access, disclosure, loss, and/or corruption by having special procedures for use and potential storage in public areas, such as hotels, restaurants, car parks. Further, any back-up and/or disaster-recovery sites may have the same special procedures for the same level of protection.

In the event that the identity provider and/or credential broker has sensitive information to be disposed of, such as unhashed identification information received by the credential broker, disposal methods may meet or exceed the requirements and/or policies of various standard setting bodies, including the Department of Defense ("DOD") and/or National Institute of Standards and Technology ("NIST"), in order to ensure that techniques applied match the storage media technology in use. When third-party services are used, those entities may be required to guarantee and take responsibility for observing or exceeding those same requirements and/or policies.

Communications between components of the identity provider and/or credential broker and outside of a common demilitarized zone ("DMZ") may be encrypted and/or mutually-authenticated using protocols that meet and/or exceed recognized best practices for a threat scenario used by a risk assessment process. Risk assessments may analyze threats including, but not limited to, password guessing; message replay; eavesdropping; introduction of malicious code; compromised authentication arising from insider action; out-of-band attacks by users, system operators, and/or third-parties; spoofing of system elements and/or applications; malfeasance on the part of a user; and/or intrusions leading to information theft.

Each transaction may be protected by end-to-end encryption, such that all data transfers are secured. Additionally, full-time automated monitoring and test script execution may be provided with automated notification to operational personnel. Further, daily system management reports may be produced, reviewed, and/or protectively stored. System management reports may include security events, transactions processed, system usage and/or capacity, and/or system availability.

The identity provider and/or credential broker may employ an identity-based key management architecture. Keys may be assigned key names (identities) and the assigned key names may be used to reference the appropriate key. The key naming model may be used with an identity-based encryption, in which the key name may be mathematically converted into a public key, as well as with symmetric encryption algorithms, such as format-preserving encryption ("FPE"), and advanced encryption standards ("AES"), in which the key name may be used to derive a symmetric key.

Initially, an identity provider and/or credential broker base key may be generated. A separate base key may also be generated for each encryption algorithm. The identity-based encryption ("IBE") base key may be maintained as a master secret. Further, a one-time backup of the one or more IBE base keys may be performed in order to provide for disaster recovery.

When a key is requested from a Key Management System ("KMS"), the key name may be used to generate the actual keying material, i.e., the symmetric key in the case of symmetric encryption algorithms, such as FPE, AES, and/or triple data encryption standard ("3DES"), and the private key, in the case of IBE. After the requesting entity has been appropriately authenticated, the KMS may use a Key Derivation Function ("KDF") to combine the base key and the key name, producing the actual keying material.

This derived-key approach enables the KMS of an identity provider and/or credential broker to be stateless, which allows individual encryption keys to be generated on-demand from a base key. The ability to derive keys may be deployed in a highly distributed environment without the need to continuously replicate keys across servers. For example, if a key is required for disaster recovery or audit purposes, the key may be regenerated.

Keys may have a predetermined lifecycle when used to encrypt data, and may be refreshed on a predetermined schedule. The KMS of the identity provider and/or credential broker may incorporate a key expiration and derivation system that allows complete management of a key lifecycle. Keys provided by the identity provider and/or credential broker may include an inherent time reference that determines when the key is to be automatically cycled. Additionally, keys may reference distinct base keys, which allows for a procedure-based key refresh.

Any of the systems, servers, modules, and/or devices, discussed above may include any type or combination of computing systems, such as handheld devices, personal computers, servers, clustered computing machines, and/or cloud computing systems. In one embodiment, the above-described systems, servers, modules, and devices may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The user interface may include any type or combination of input/output devices, such as a display monitor, touchpad, touchscreen, microphone, camera, keyboard, and/or mouse.

Figure 4:
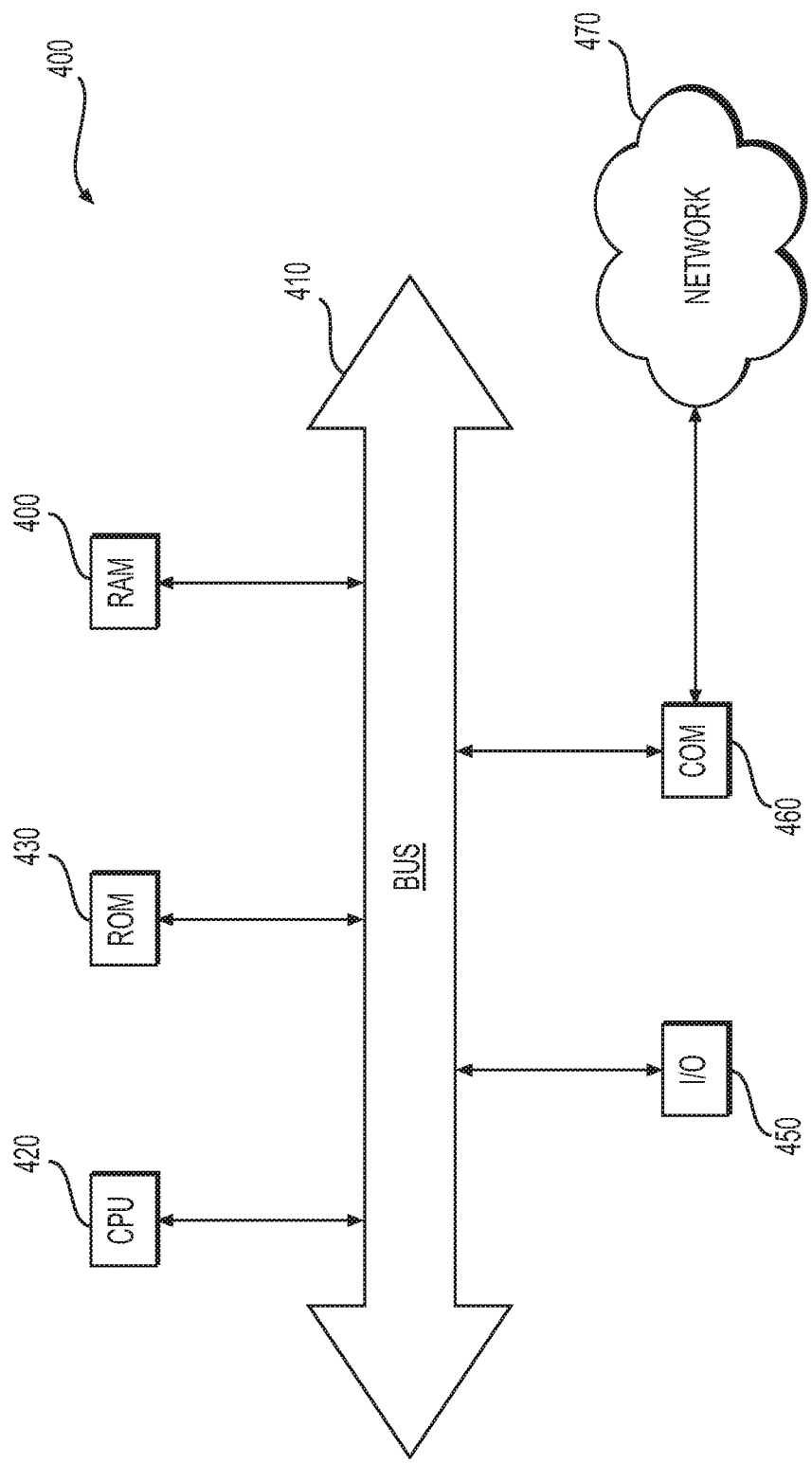
FIG. 4 depicts a simplified functional block diagram of a computer that may be configured as a system, device, module, or server for executing the methods describe in conjunction with the figures above, according to exemplary embodiments of the present disclosure.

FIG. 4 is a simplified functional block diagram of a computer that may be configured as a device or server for executing the methods, procedures, policies, and/or calculation discussed in reference to FIGS. 1-3, according to exemplary embodiments of the present disclosure. Specifically, in one embodiment, as shown in FIG. 4, any of the above-described systems, servers, modules, and/or devices may be an assembly of hardware 400 including, for example, a data communication interface 460 for packet data communication. The platform may also include a CPU 420, in the form of one or more processors, for executing program instructions. The platform typically includes an internal communication bus 410, program storage, and data storage for various data files to be processed and/or communicated by the platform such as ROM 430 and RAM 440, although the system 400 often receives programming and data via network communications 470. The server 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, which may be used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to applications and to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for secure online credential authentication, the method including:
   receiving, at a server, first identification information from a first identity provider, wherein the first identification information includes at least a first portion of the first identification information;
   based on receiving the first identification information from the first identity provider, hashing, by the server, the at least first portion of the first identification information by a hashing function to produce a first hashed portion of the first identification information;
   accessing, by the server from a database, previously stored hashed identification information stored as a hash in association with a previous identity provider;
   comparing, by the server, the first hashed portion of the first identification information as a hash to the previously stored hashed identification information as a hash; and
   storing, by the server, the first hashed portion of the first identification information as a hash in association with the first identity provider that provided the first identification information in the database when the first hashed portion of the first identification information as a hash does not match the previously stored hashed identification information as a hash.

2. The method of claim 1, further comprising:
   receiving, at the server, second identification information from a second identity provider;
   accessing, by the server from the database, previously stored hashed identification information stored in association with a previous identity provider;
   comparing, by the server, the second identification information to previously stored hashed identification information; and
   comparing, by the server, the second identity provider that provided the second identification information to previously stored identity provider stored in association with the previously stored hashed identification information when the second identification information matches previously stored hashed identification information.

3. The method of claim 1, wherein receiving the first identification information from the first identity provider includes:
receiving, at the server, previously hashed identification information from the first identity provider.

4. The method of claim 2, wherein receiving the second identification information from the second identity provider includes:
receiving, at the server, the second identification information from the second identity provider, wherein the second identification includes at least a first portion of the second identification information;
based on receiving the second identification information from the second identity provider, hashing, by the server, the at least first portion of the second identification information by a hashing function to produce a first hashed portion of the second identification information; and
deleting, by the server, the second identification information receiving from the second identity provider.

5. The method of claim 2, wherein receiving the second identification information from the second identity provider includes:
receiving, at the server, hashed second identification information from the second identity provider.

6. The method of claim 2, further comprising:
transmitting, by the server, a positive authentication result when the second identification information matches previously stored hashed identification information, and when the second identity provider matches the previously stored identity provider stored in association with the previously stored hashed identification information.

7. The method of claim 1, wherein receiving the first identification information from the first identity provider includes:
receiving, at the server, first identification information from the first identity provider, wherein the first identification information includes at least a first portion of the first identification information and a second portion of the first identification information.

8. A system for secure online credential authentication, the system including:
a data storage device that stores instructions system for secure online credential authentication; and
a processor configured to execute the instructions to perform a method including:
receiving, at a server, first identification information from a first identity provider, wherein the first identification information includes at least a first portion of the first identification information;
based on receiving the first identification information from the first identity provider, hashing, by the server, the at least first portion of the first identification information by a hashing function to produce a first hashed portion of the first identification information;
accessing, by the server from a database, previously stored hashed identification information stored as a hash in association with a previous identity provider;
comparing, by the server, the first hashed portion of the first identification information as a hash to the previously stored hashed identification information as a hash; and
storing, by the server, the first hashed portion of the first identification information as a hash in association with the first identity provider that provided the first identification information in the database when the first hashed portion of the first identification information as a hash does not match the previously stored hashed identification information as a hash.

9. The system according to claim 8, wherein the processor is further configured to execute the instructions to perform the method including:
receiving, at the server, second identification information from a second identity provider;
accessing, by the server from the database, previously stored hashed identification information stored in association with a previous identity provider;
comparing, by the server, the second identification information to previously stored hashed identification information; and
comparing, by the server, the second identity provider that provided the second identification information to previously stored identity provider stored in association with the previously stored hashed identification information when the second identification information matches previously stored hashed identification information.

10. The system of claim 8, wherein receiving the first identification information from the first identity provider includes:
receiving, at the server, previously hashed identification information from the first identity provider.

11. The system of claim 9, wherein receiving the second identification information from the second identity provider includes:
receiving, at the server, the second identification information from the second identity provider, wherein the second identification includes at least a first portion of the second identification information;
based on receiving the second identification information from the second identity provider, hashing, by the server, the at least first portion of the second identification information by a hashing function to produce a first hashed portion of the second identification information; and
deleting, by the server, the second identification information receiving from the second identity provider.

12. The system of claim 9, wherein receiving the second identification information from the second identity provider includes:
receiving, at the server, hashed second identification information from the second identity provider.

13. The system of claim 9, further comprising:
transmitting, by the server, a positive authentication result when the second identification information matches previously stored hashed identification information, and when the second identity provider matches the previously stored identity provider stored in association with the previously stored hashed identification information.

14. The system of claim 9, wherein receiving the first identification information from the first identity provider includes:
receiving, at the server, first identification information from the first identity provider, wherein the first identification information includes at least a first portion of the first identification information and a second portion of the first identification information.

15. A non-transitory computer-readable medium storing instructions that, when executed by a computer, cause the computer to perform a method for secure online credential authentication, the method including:

receiving, at a server, first identification information from a first identity provider, wherein the first identification information includes at least a first portion of the first identification information;

based on receiving the first identification information from the first identity provider, hashing, by the server, the at least first portion of the first identification information by a hashing function to produce a first hashed portion of the first identification information;

accessing, by the server from a database, previously stored hashed identification information stored as a hash in association with a previous identity provider;

comparing, by the server, the first hashed portion of the first identification information as a hash to the previously stored hashed identification information as a hash; and storing, by the server, the first hashed portion of the first identification information as a hash in association with the first identity provider that provided the first identification information in the database when the first hashed portion of the first identification information as a hash does not match the previously stored hashed identification information as a hash.

16. The computer-readable medium according to claim 15, further comprising:

receiving, at the server, second identification information from a second identity provider;

accessing, by the server from the database, previously stored hashed identification information stored in association with a previous identity provider;

comparing, by the server, the second identification information to previously stored hashed identification information; and comparing, by the server, the second identity provider that provided the second identification information to previously stored identity provider stored in association with the previously stored hashed identification information when the second identification information matches previously stored hashed identification information.

17. The computer-readable medium according to claim 15, wherein receiving the first identification information from the first identity provider includes:

receiving, at the server, previously hashed identification information from the first identity provider.

18. The computer-readable medium according to claim 16, wherein receiving the second identification information from the second identity provider includes:

receiving, at the server, the second identification information from the second identity provider, wherein the second identification includes at least a first portion of the second identification information;

based on receiving the second identification information from the second identity provider, hashing, by the server, the at least first portion of the second identification information by a hashing function to produce a first hashed portion of the second identification information; and deleting, by the server, the second identification information receiving from the second identity provider.

19. The computer-readable medium according to claim 16, further comprising:

transmitting, by the server, a positive authentication result when the second identification information matches previously stored hashed identification information, and when the second identity provider matches the previously stored identity provider stored in association with the previously stored hashed identification information.

20. The computer-readable medium according to claim 15, wherein receiving the first identification information from the first identity provider includes:

receiving, at the server, first identification information from the first identity provider, wherein the first identification information includes at least a first portion of the first identification information and a second portion of the first identification information.

* * * * *

UNITED STATES PATENT AND TRADEMARK OFFICE
CERTIFICATE OF CORRECTION

| | |
|---|---|
| PATENT NO. | : 11,310,231 B2 |
| APPLICATION NO. | : 16/557161 |
| DATED | : April 19, 2022 |
| INVENTOR(S) | : Blake Hall |

It is certified that error appears in the above-identified patent and that said Letters Patent is hereby corrected as shown below:

In the Specification

In Column 1, Line 7, after "application" insert --is a continuation of and claims the benefit of priority to U.S. Nonprovisional Patent Application No. 15/294,434, filed Oct. 14, 2016, which--.

In Column 1, Lines 9-10, delete "is herein incorporated by reference." and insert --are incorporated herein by reference in their entireties.--.

Signed and Sealed this
Sixteenth Day of August, 2022

*Katherine Kelly Vidal*

Katherine Kelly Vidal
*Director of the United States Patent and Trademark Office*